United States Patent

[11] 3,588,482

[72] Inventor Roger C. Glidden
Wenham, Mass.

[21] Appl. No. 726,783
[22] Filed May 6, 1968
[45] Patented June 28, 1971
[73] Assignee The Glidden Electric Corporation

[54] DECIMAL TO BINARY CONVERTER
12 Claims, 5 Drawing Figs.

[52] U.S. Cl. .......... 235/155, 340/347, 178/92
[51] Int. Cl. .......... H04l 3/00
[50] Field of Search .......... 340/347; 178/26, 26.5; 235/155

[56] References Cited

UNITED STATES PATENTS

| | | | |
|---|---|---|---|
| 2,868,450 | 1/1959 | Hemstreet .......... | 235/155 |
| 2,910,534 | 10/1959 | Cunningham .......... | 178/26.5 |
| 3,090,833 | 5/1963 | Zenner .......... | 235/155 |

*Primary Examiner*—Maynard R. Wilbur
*Assistant Examiner*—Jeremiah Glassman
*Attorneys*—Clarence A. O'Brien and Harvey B. Jacobson

ABSTRACT: A converter for transforming spaced series of input pulses representing a decimal code into binary information on a multitrack tape fed from a tape perforator suitable for computer read in purposes. Each series of input pulses advances a stepper switch to a decimal contact position during a timed read in period followed by a recording period during which one or more punch devices are operated by a recording pulse transmitted through diode logic from the stepper switch contact at which the switch wiper stopped during the preceding read in period. A tape advancing pulse of longer duration than the recording pulse also initiated at the beginning of the recording period in order to operate the tape advancing mechanism of the tape perforator after recording is completed. Signal conversion is completed with reset of the stepper switch terminating the tape advance pulse after which the tape is advanced by a predetermined amount.

Roger C. Glidden

INVENTOR

BY Clarence A. O'Brien and Harvey B. Jacobson

Attorneys

Roger C. Glidden
INVENTOR
BY Clarence A. O'Brien
and Harvey B. Jacobson
Attorneys

DECIMAL TO BINARY CONVERTER

This invention relates to the conversion of digital information and more particularly to the conversion of input signals in the form of a series of pulses into punch recordings along a plurality of tracks on code tape.

Digital information in the form of spaced series of decimal code pulses must often be converted into a binary code suitable for read in of the information into a computer. Tape perforators for example are commercially available which will punch such digital information on a plurality of tracks suitable for digital computers. A tape perforator of this type is manufactured by Tally Corporation of Seattle, Washington, marketed under the designation of Model P-30, Tally Tape Perforator. These tape perforators, however, require a special signal converting apparatus in order to handle decimal pulse information received from certain signal sources such as those received at the receiver component of the telephone reporting system disclosed in my prior copending application U.S. Ser. No. 618,602, filed Feb. 27, 1967 now U.S. Pat. No. 3,390,234. Thus, it is an important object of the present invention to provide a digital signal converter fulfilling the aforementioned requirements in a relatively simple and inexpensive manner.

In accordance with the present invention, the digital signal converter includes a stepper switch assembly having a wiper contact arm which is advanced by a stepper drive coil past decimal contact positions in which the contacts are connected by diode logic to four punch coils associated with the tape perforator through which binary information is recorded along four tracks. The stepper drive coil is accordingly pulsed by the input signal pulses causing the wiper to advance to and stop at a corresponding decimal contact during a timed read-in period initiated in response to initial displacement of the wiper from its start position at the beginning of a series of input signal pulses. The timed read-in period is prescribed by a timing circuit, the timing cycle of which is of a duration sufficient to permit advancement of the wiper past all of the contacts. The timing circuit establishes an energizing circuit for a relay assembly, the energization of which is delayed for said read-in period in order to subsequently initiate a recording period during which a current pulse is supplied through the wiper and the diode logic to one or more of the punch coils associated with the tape perforator. At the same time, the relay assembly conducts current to the tape advance coil and feed hole punch coil associated with the tape perforator in order to initiate a tape advance pulse. Upon completion of the recording pulse, the relay assembly initiates operation of a reset coil causing return of the wiper to the start position. After the wiper reaches the start position, at the end of a operational cycle, the tape advance pulse is terminated so that the tape advancing mechanism associated with the tape perforator may incrementally advance the tape by a fixed amount in preparation for conversion and recording of the next series of signal input pulses. Reset of the converter also restores the timing circuit to its initial condition preventing energization of the relay assembly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
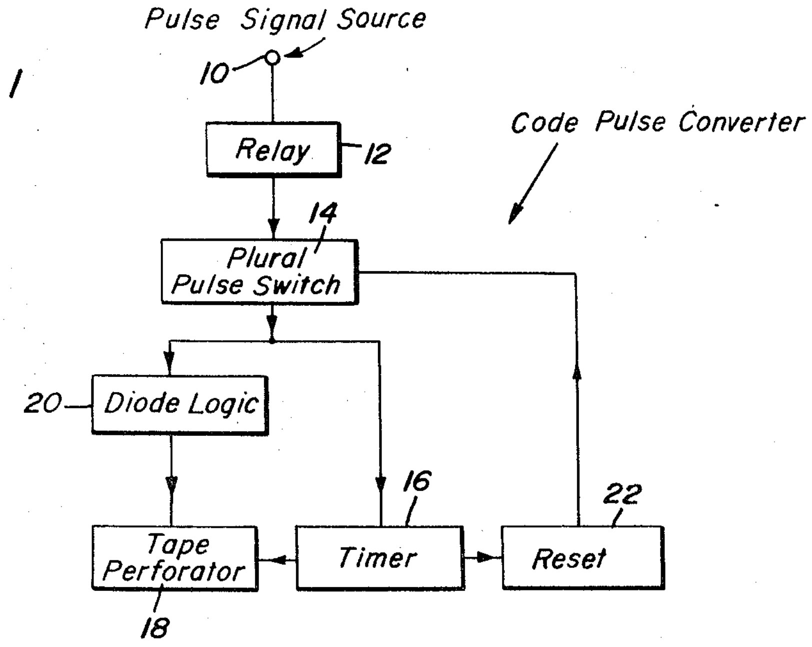
FIG. 1 is a block diagram schematically illustrating the signal converting system of the present invention.

Referring now to the drawings in detail, FIG. 1 diagrammatically illustrates the components associated with the converter which includes a relay assembly generally referred to by reference numeral 12 to which signals are fed from a source 10. The signals are supplied through the relay assembly to a plural contact step switch 14 causing advancement thereof during a read-in period prescribed by the timer component 16 to which the step switch 14 is connected. Operation of the timer 16 is initiated by operation of the step switch which is also operative to supply operating current to the tape perforator 18 through diode logic 20 for recording purposes. Reset means 22 to which the timer 16 is connected, is operative on the step switch so as to return it to its initial position in preparation for conversion of a series of input signal pulses from the source 10 spaced in time from the preceding series by a minimum interval which exceeds in time the operation cycle of the converter.

Figure 4:
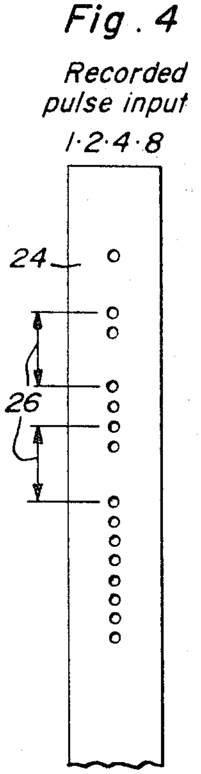
FIG. 4 illustrates a punched tape recording of the input signals to be converted by the system of the present invention.
Figure 5:
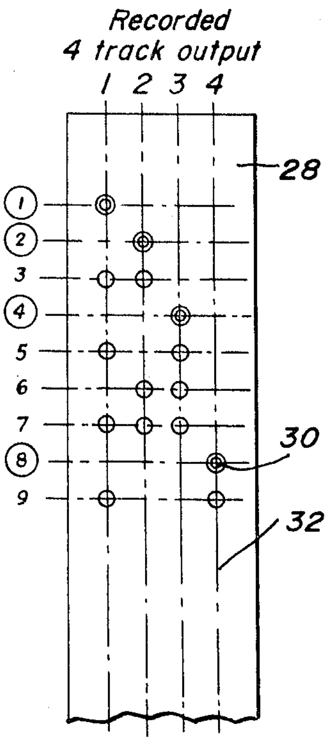
FIG. 5 illustrates a portion of the multitrack tape on which the converted signal is recorded in accordance with the present invention.

As shown in FIG. 4, the input signals derived from the source 10 when directly recorded on tape 24 form a plurality of spaced series of punch holes representing input signal pulses. Each series of pulses is recorded during a preset period adequate for signal processing +1 pulse signal interval, represented on tape 24 by reference numeral 26 which exceeds the duration of one cycle of operation in the converter necessary to transform one series of pulses into one or more punched holes in one position of the tape 28 as shown in FIG. 5 which is incrementally advanced by the tape perforator 18 after recording a transformed series of input pulses. In the illustrated embodiment, the series of pulses recorded on the tape 24 constitute a decimal code so that a maximum of nine pulses may be recorded in any one series. This decimal information corresponds to the binary digital information recorded by punched holes 30 on one or more of the four tracks 32 formed along the tape 28.

Figure 2:
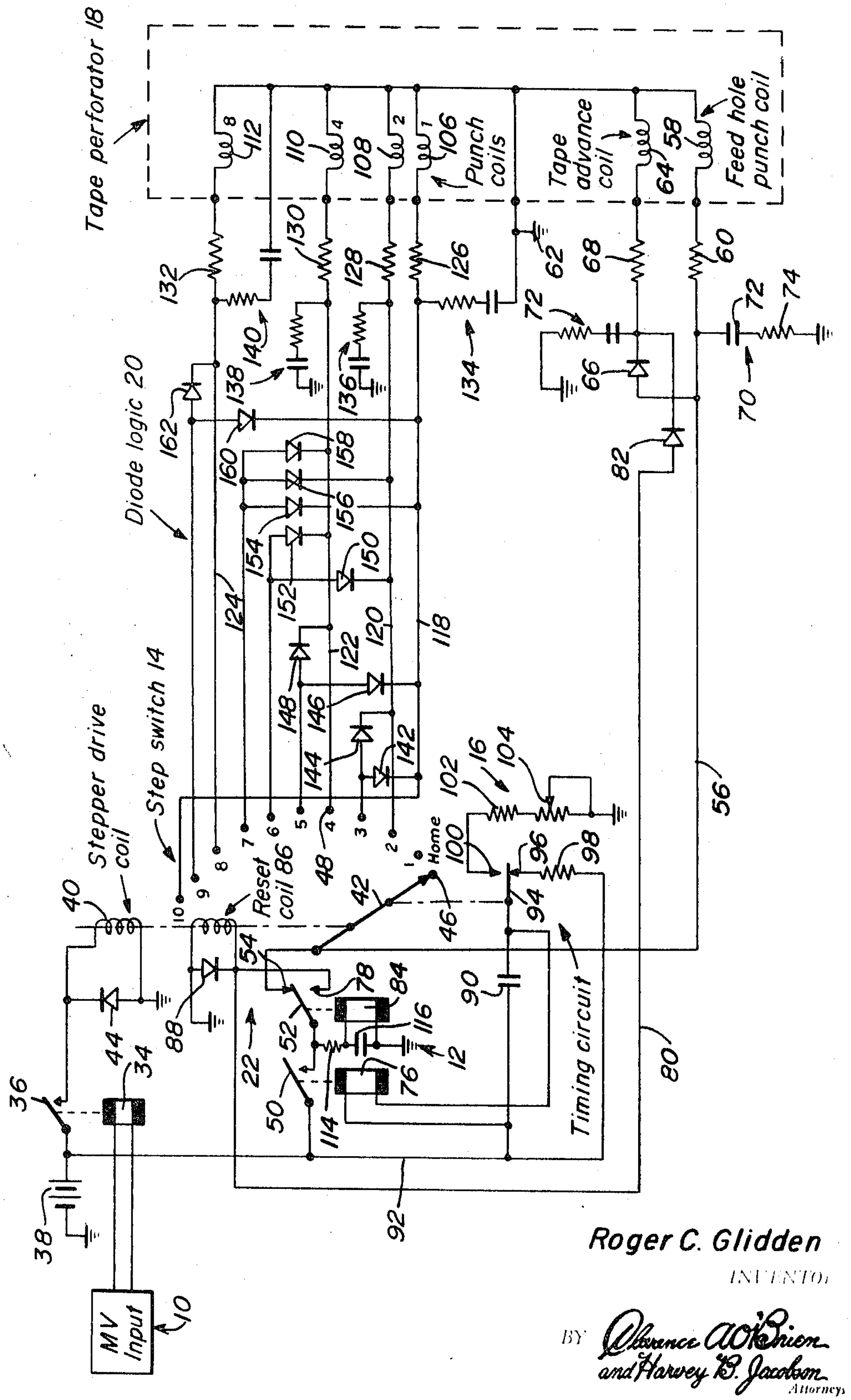
FIG. 2 is an electrical circuit diagram corresponding to the signal converter of the present invention.

Referring now to FIG. 2, it will be observed that the source of signal pulses 10 such as those received at the receiving station associated with a system disclosed in my prior copending application aforementioned, pulses the signal input relay coil 34 to intermittently close the normally opened relay switch 36 connecting a suitable source of voltage 38 to the stepper drive coil 40 associated with the step switch 14. Momentary closing and opening of the relay switch 36 in response to input signal pulses is operative to correspondingly advance the wiper contact arm 42 to which the solenoid associated with the stepper drive coil is operatively connected. A diode 44 is connected across the stepper drive coil to conduct any reverse current in bypass relation to the stepper drive coil resulting from any induced counter EMF produced upon opening of the energizing circuit for the drive coil by the relay switch 36. It will therefore be apparent, that a series of closely spaced signal pulses supplied to the signal input relay 34 will cause incremental advancement of the wiper 42 from a start position in which the wiper engages contact 46 to one of the numbered contacts 48. Although there are ten numbered contacts 48, contact number 1 is inactive in order to permit the wiper 42 to advance at least one increment before any signal pulses are recorded. Contact number 10 is therefore substituted for contact number 1 as will be hereafter explained.

The voltage source 38 is connected to the normally opened relay switch 50 associated with the relay component 12. Relay switch 50 is connected in series with the normally closed relay switch 52 engaging contact 54 to which the step switch wiper 42 is electrically connected. Also connected to the normally engaged contact 54, is the conductor 56 to which the feed hole punch coil 58 of the tape perforator is connected through the coupling resistor 60. Accordingly, upon closing of the normally opened relay switch 50, DC voltage is supplied from the voltage source 38 to the wiper and to the feed hole punch coil 58 completing an energizing circuit through the feed hole punch coil to ground 62. An energizing circuit for the tape advance coil 64 is also completed at the same time since it is connected between the conductor 56 and ground 62 in series with the diode 66 and resistor 68. Filter networks 70 and 72 are respectively connected to the coil energizing circuits including for example the series connected filter capacitor 72 and bleed resistor 74 in order to compensate for induced counter EMF voltages resulting from opening of the deenergizing circuits. The normally opened relay switch 50 is closed to complete energizing circuits for the feed punch coil 58 and tape advance coil 64 upon energization of the relay coil 76. An alternate energizing circuit for the tape advance coil 64 is established when the relay switch 52 is actuated from the normal position illustrated in FIG. 2 into a position engaging the contact 78. Accordingly, the contact 78 is connected through conductor 80 and diode 82 to the tape advance coil 64 through coupling resistor 68. Relay switch 52 is actuated upon energization of the relay coil 84 in order to prolong energization of the tape advance coil 64 during reset of the step switch 14. The relay contact 78 is therefore also connected to the reset coil 86 to complete an energizing circuit therethrough to ground from the voltage source 38 through closed relay switch 50. A diode 88 is connected across the reset coil to prevent flow of reverse current through the reset coil. Energization of the reset coil is operative on the wiper 42 to return it to the start position from any operative contact 48 at which it previously stopped during read-in.

The timing circuit 16 includes a timing capacitor 90 connected in parallel with the relay coil 76 between the DC voltage line 92 from the voltage source 38 and a timer starting switch 94 normally engaging contact 96 as illustrated in FIG. 2. Contact 96 is connected to the voltage line 92 through resistor 98 in order to prevent charging of the capacitor 90 as long as the starting switch 94 engages contact 96. The starting switch 94 is however operatively connected to the wiper 42 so as to be displaced thereby into engagement with contact 100 whenever the wiper is advanced from its start position. The contact 100 is connected through fixed resistor 102 to a grounded control potentiometer 104 forming a time-controlled charging circuit for the capacitor 90 when the starting switch 94 is displaced into engagement with the contact 100. It will be apparent therefore, that in response to initial advancement of the wiper 42 from its start position, operation of the timing circuit 16 is initiated in order to establish a read-in period of adjustably fixed duration during which the capacitor 90 is charged to a peak value. Since the capacitor 90 is connected in parallel with the relay coil 76, when it is full charged at the end of the read-in period, relay coil 76 is pulsed in order to close the normally opened relay switch 50. Thus DC voltage from the voltage source 38 will be supplied through the relay switch 50 and the relay switch 52 to one of the operative contacts 48 to which the wiper 42 was displaced during the preceding read-in period. The feed hole punch coil 58 and tape advance coil 64 will be simultaneously energized as aforementioned. At the same time, one or more of the recording punch coils 106, 108, 110 and 112 in the tape perforator will be energized through circuits established by the diode logic between the punch coils and the operative contacts 48 of the step switch. The feed hole punch coil and one or more of the recording punch coils will remain energized for a relatively short recording period terminated by energization of the relay coil 84 displacing the relay switch 52 into engagement with the contact 78, an energizing circuit being established for the relay coil 84 through the relay switch 50 and resistor 114. However, capacitor 116 connected across the relay coil 84 to ground delays energization of the relay coil 84 upon closing of the normally opened relay switch 50 in order to time the pulse duration or recording period for the recording punch coils and feed hole punch coil.

It will be observed from FIG. 2, that the diode logic 20 includes circuit lines 118, 120, 122 and 124 respectively connecting contact Nos. 10, 2, 4 and 8 to the recording punch coils through resistors 126, 128, 130 and 132. Inasmuch as all of the recording punch coils are connected in parallel to ground 62, energizing circuits for the recording punch coils will be completed through the wiper 42 and one of the four circuit lines when the wiper engages contact Nos. 10, 2, 4 and 8. Grounded filter networks 134, 136, 138 and 140 are connected to the circuit lines in order to filter inductively induced voltages. Energization of one of the recording punch coils corresponds to a predetermined number of decimal input signal pulses represented by one of the four contact positions to which the wiper 42 is displaced as aforementioned. When engaged with the other operative contacts 48, two or more of the recording punch coils are energized simultaneously in order to record converted digital information corresponding to the other operative contact positions of the wiper. Thus, contact No. 3 is connected by diodes 142 and 144 to the circuit lines 118 and 120. Contact No. 5 is connected by diodes 146 and 148 to the circuit lines 118 and 122. Contact No. 6 is connected by diodes 150 and 152 to circuit lines 120 and 122. Diodes 154, 156 and 158 connect contact No. 7 to circuit lines 118, 120 and 122. Finally, contact No. 9 is connected by diodes 160 and 162 to circuit lines 118 and 124. Thus, the recording punch coils 106, 108, 110 and 112 respectively corresponding to decimal digits 1, 2, 4 and 8 may be energized in different combinations in order to add up to the other decimal digits 3, 5, 6, 7 and 9.

Figure 3:
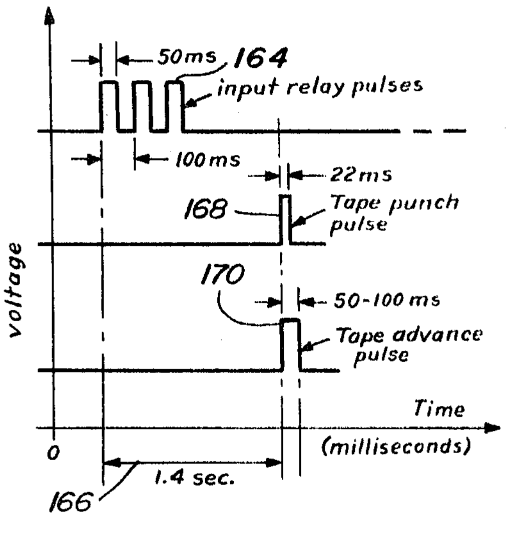
FIG. 3 is a graphical illustration of the operating characteristics associated with the signal converter.

The converter of the present invention may be designed to convert a series of decimal input pulses wherein each pulse has a duration of 50 milliseconds and is spaced from a preceding pulse by 50 milliseconds as graphically depicted by the input pulses 164 in FIG. 3. Since there will be a maximum of 9 input pulses in any series, the duration of the read-in period (1.4 seconds) 166 as depicted in FIG. 3 is sufficient to accommodate receipt of the maximum number of input pulses. The read-in period is initiated upon receipt of the initial input pulse causing advancement of the wiper 42 to displace the timer starting switch 94 into engagement with contact 100. The read-in period is terminated when the capacitor 90 in the timing circuit is fully charged causing energization of the relay coil 76 closing the normally opened relay switch 50. Energizing current is then conducted by relay switch 50 and relay switch 52 to the wiper and to the feed hole punch and tape advance coils 58 and 64. The wiper which was displaced to one of the operative contacts 48 during the preceding read-in period, supplies energizing current to one or more of the recording punch coils through the diode logic. Energizing current for the recording punch coils and the feed hole punch coil is interrupted by energization of the relay coil 84 displacing the relay switch 52 into engagement with contact 78 in order to terminate a recording period determining the duration of the tape punch pulse 168 as depicted in FIG. 3. While the tape punch pulse is of a relatively short duration such as 22 milliseconds, a tape advance pulse 170 of longer duration is required in order to effect operation of the tape advancing mechanism of the tape perforator. Thus, the tape advance coil 64 remains energized upon energization of the relay coil 84 because of the alternate energizing circuit established through conductor 80 and diode 82. When the relay coil 84 is energized at the end of the recording period, relay switch 52 also energizes the reset coil 86 returning the step switch wiper 42 to its start position. When the wiper 42 reaches its start position, the timer starting switch 94 is returned to its position engaging contact 96 so as to open the energizing circuit for the relay coil 76. The relay coil 76 is thereby deenergized so as to open the relay switch 50 causing deenergization of the relay coil 84, to terminate an operational cycle. The duration of the tape advance pulse 170 will therefore depend upon the position to which the wiper 42 is displaced during the read-in period and may vary between 50 and 100 milliseconds. Termination of the tape advance pulse at the end of the operational cycle causes advancement of the tape by the tape advancing mechanism of the tape perforator to a new position in preparation for the recording of the next series of input pulses. It will be apparent therefore, that a series of input pulses equal in number to a decimal digit, will be converted into one or more recorded punch holes on the four tracks 32 of tape 28 in one position of the tape corresponding to the converted series. In order to allow advancement of the tape 28 from a previous recording position to a following nonrecording position without punching any code holes, contact No. 1 in the step switch is made inactive as aforementioned. A space on the tape 28 is thereby established between complete code messages from source 10. Contact No. 10 in the step switch is therefore used to record a decimal digit 1, when a series of 10 input pulses is received from source 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. In combination with a signal source from which time spaced signal pulses are obtained and a multitrack tape perforator having a plurality of pulse recording devices and incremental tape advancing means, a code converter comprising a multiposition step switch having a plurality of contacts and a wiper engageable therewith, logic means connecting said contacts to the pulse recording devices for establishing energizing circuits to operate the respective recording devices, signal input means responsive to a sequence of said signal pulses from said source for incrementally advancing said wiper from a start position to one of the contacts during a read-in period of fixed duration, relay means responsive to termination of said period of fixed duration for simultaneously supplying operating current to the contact engaged by the wiper and to the tape advancing means and reset means connected to the relay means for returning the step switch wiper to the start position and limiting supply of operating current to the recording devices to a preset recording period.

2. The combination of claim 1 including means connected to said reset means for prolonging supply of operating current to the tape advancing means in accordance with the amount said wiper is advanced from start position.

3. The combination of claim 2 wherein said relay means comprises a source of voltage, a normally opened relay switch and a normally closed relay switch connected in series between said source of voltage and the wiper, a relay coil connected to the source of voltage for closing the normally opened relay switch at the end of said period of fixed duration, timing means connected to the wiper and the relay coil for initiating a timing cycle in response to advancement of the wiper from the start position to limit movement thereof to said period of fixed duration, means for energizing the reset means in response to closing of the normally opened relay switch and simultaneously opening the normally closed relay switch, and means for delaying said energization of the reset means for said preset period, said tape advancing means being connected to the normally closed relay switch in parallel with the wiper and means for alternately energizing the tape advancing means in response to opening of the normally closed relay switch.

4. The combination of claim 3 wherein said timing means comprises a starting switch actuated by the wiper when advanced from the start position, a timing capacitor connected to the starting switch in parallel with said relay coil to delay energization thereof for said period of fixed duration, time control means connected to the starting switch for completing an energizing circuit through the relay coil in response to actuation of the starting switch by the wiper, and relay disabling means for preventing energization of the relay coil when the wiper is in the start position.

5. The combination of claim 4 wherein said logic means comprises a plurality of circuit lines less than nine in number connected between said pulse recording devices and an equal number of the contacts, and unidirectional conducting means connecting the remaining contacts to one or more of the circuit lines.

6. The combination of claim 1 including a starting switch actuated by the wiper when advanced from the start position, a timing capacitor connected to the starting switch in parallel with said relay means to delay energization thereof for said period of fixed duration, time control means connected to the starting switch for completing an energizing circuit through the relay means in response to actuation of the starting switch by the wiper, and relay disabling means for preventing energization of the relay means when the wiper is in the start position.

7. The combination of claim 6 including means connected to said reset means for prolonging supply of operating current to the tape advancing means in accordance with the amount said wiper is advanced from start position.

8. The combination of claim 1 wherein said logic means comprises a plurality of circuit lines less than nine in number connected between said pulse recording devices and an equal number of the contacts, and unidirectional conducting means connecting the remaining contacts to one or more of the circuit lines.

9. The combination of claim 1 wherein said relay means comprises a source of voltage, a normally opened relay switch and a normally closed relay switch connected in series between said source of voltage and the wiper, a relay coil connected to the source of voltage for closing the normally opened relay switch at the end of said period of fixed duration, timing means connected to the wiper and the relay coil for initiating a timing cycle in response to advancement of the wiper from the start position to limit movement thereof to said period of fixed duration, means for energizing the reset means in response to closing of the normally opened relay switch and simultaneously opening the normally closed relay switch, and means for delaying said energization of the reset means for said preset period, said tape advancing means being connected to the normally closed relay switch in parallel with the wiper and means for alternately energizing the tape advancing means in response to opening of the normally closed relay switch.

10. The combination of claim 9 wherein said timing means comprises a starting switch actuated by the wiper when advanced from the start position, a timing capacitor connected to the starting switch in parallel with said relay coil to delay energization thereof for said period of fixed duration, time control means connected to the starting switch for completing an energizing circuit through the relay coil in response to actuation of the starting switch by the wiper, and relay disabling means for preventing energization of the relay coil when the wiper is in the start position.

11. Apparatus for translating input data when received into code data recorded by recording means on a recording medium that is intermittently advanced by an advancing mechanism comprising input switch means advanced from a start position by a variable amount representing the input data, timing means connected to the switch means for limiting advancement thereof to a recording period of fixed duration, code transforming means connecting the switch means to the recording means conditioning the recording means for operation during the recording period, means responsive to termination of said recording period for establishing a period of variable duration depending on the variable amount the switch means is advanced, means for operating the recording means during said period of variable duration and means for operating the advancing mechanism in response to termination of said period of variable duration.

12. The combination of claim 11 including reset means connected to the switch means for returning the same to the start position and terminating the period of variable duration.